United States Patent

Henry

(10) Patent No.: US 12,536,750 B1
(45) Date of Patent: Jan. 27, 2026

(54) SYSTEMS AND METHODS FOR STREAMING ARTIFICIAL REALITY DATA

(71) Applicant: Meta Platforms Technologies, LLC, Menlo Park, CA (US)

(72) Inventor: Colleen Kelly Henry, Oakland, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 228 days.

(21) Appl. No.: 18/164,945

(22) Filed: Feb. 6, 2023

(51) Int. Cl.
  *G06T 19/00* (2011.01)
  *G02B 27/01* (2006.01)
  *G06F 3/0482* (2013.01)
  *H04N 21/2187* (2011.01)

(52) U.S. Cl.
  CPC ........ *G06T 19/006* (2013.01); *G02B 27/0172* (2013.01); *G06F 3/0482* (2013.01); *H04N 21/2187* (2013.01); *G02B 2027/0178* (2013.01)

(58) Field of Classification Search
  CPC . G06T 19/006; G02B 27/0172; G06F 3/0482; H04N 21/2187
  See application file for complete search history.

(56) References Cited

U.S. PATENT DOCUMENTS

| | | | |
|---|---|---|---|
| 6,559,863 B1 | 5/2003 | Megiddo | |
| 8,537,196 B2 | 9/2013 | Hegde et al. | |
| 8,581,958 B2 | 11/2013 | Baker et al. | |
| 8,675,067 B2 | 3/2014 | Chou et al. | |
| 9,338,404 B1 | 5/2016 | Egeler et al. | |
| 9,401,095 B2 | 7/2016 | Kubota et al. | |
| 9,460,340 B2 | 10/2016 | Kauffmann et al. | |

(Continued)

FOREIGN PATENT DOCUMENTS

| | | |
|---|---|---|
| CA | 3039347 A1 | 4/2018 |
| EP | 2400464 A2 | 12/2011 |

(Continued)

OTHER PUBLICATIONS

"OBS Studio Overview Guide", Open Broadcast Software, Aug. 5, 2021, pp. 1-23, <https://obsproject.com/kb/obs-studio-overview>, <https://obsproject.com/kb/virtual-camera-guide> (Year: 2021).*

(Continued)

*Primary Examiner* — Terrell M Robinson
(74) *Attorney, Agent, or Firm* — Potomac Law Group, PLLC; Dannon G. Allbee (57) ABSTRACT

A computer-implemented method for streaming artificial reality data may include (i) identifying an artificial reality device that includes a physical display that displays a stream of artificial reality data to the user of the artificial reality device, (ii) receiving, by a computing device that is configured to receive video input from a webcam, the stream of artificial reality data from the artificial reality device, (iii) representing the stream of artificial reality data from the artificial reality device as the video input from the webcam of the computing device, and (iv) providing, to an application on the computing device that is configured to receive webcam data as input, the stream of artificial reality data from the artificial reality device represented as the video input from the webcam of the computing device. Various other methods, systems, and computer-readable media are also disclosed.

20 Claims, 8 Drawing Sheets

(56) References Cited

U.S. PATENT DOCUMENTS

| | | | |
|---|---|---|---|
| 9,841,814 | B1 | 12/2017 | Kallmeyer et al. |
| 9,959,676 | B2 | 5/2018 | Barzuza et al. |
| 10,182,210 | B1 | 1/2019 | Goetzinger, Jr. |
| 10,212,428 | B2 | 2/2019 | Trepte |
| 10,298,587 | B2 | 5/2019 | Hook et al. |
| 10,311,383 | B2 | 6/2019 | Holmes et al. |
| 10,403,050 | B1 | 9/2019 | Beall et al. |
| 10,499,033 | B2 | 12/2019 | Pesonen |
| 10,554,931 | B1 | 2/2020 | Zavesky et al. |
| 10,567,449 | B2 | 2/2020 | Harner et al. |
| 10,582,191 | B1 | 3/2020 | Marchak, Jr. et al. |
| 10,664,772 | B1 | 5/2020 | Poel et al. |
| 10,701,318 | B2 | 6/2020 | Valli |
| 10,917,613 | B1 | 2/2021 | Chiarella et al. |
| 10,952,006 | B1 | 3/2021 | Krol et al. |
| 11,140,361 | B1 | 10/2021 | Krol et al. |
| 11,302,063 | B2 | 4/2022 | Cabral et al. |
| 11,302,085 | B2 | 4/2022 | Lebeau et al. |
| 11,394,925 | B1 | 7/2022 | Faulkner et al. |
| 11,417,069 | B1 | 8/2022 | Gupta et al. |
| 11,456,887 | B1 | 9/2022 | Mccracken et al. |
| 11,528,312 | B2 | 12/2022 | Oyman |
| 11,563,779 | B2 | 1/2023 | Copley et al. |
| 2002/0158873 | A1 | 10/2002 | Williamson |
| 2003/0218617 | A1 | 11/2003 | Ohto |
| 2003/0220981 | A1 | 11/2003 | Nakamura et al. |
| 2007/0279484 | A1 | 12/2007 | Derocher et al. |
| 2008/0036766 | A1 | 2/2008 | Ishii et al. |
| 2009/0288007 | A1 | 11/2009 | Leacock et al. |
| 2009/0300516 | A1 | 12/2009 | Jerrard-Dunne et al. |
| 2010/0085416 | A1 | 4/2010 | Hegde et al. |
| 2011/0107270 | A1 | 5/2011 | Wang et al. |
| 2012/0192088 | A1 | 7/2012 | Sauriol et al. |
| 2012/0204118 | A1 | 8/2012 | Lefar et al. |
| 2012/0246582 | A1 | 9/2012 | Leacock et al. |
| 2012/0317501 | A1 | 12/2012 | Milou |
| 2012/0327173 | A1* | 12/2012 | Couse .............. G06F 3/04847 348/E7.083 |
| 2013/0024785 | A1 | 1/2013 | Van Wie |
| 2013/0031475 | A1 | 1/2013 | Maor et al. |
| 2013/0342564 | A1 | 12/2013 | Kinnebrew et al. |
| 2014/0085316 | A1 | 3/2014 | Narayanan |
| 2014/0085406 | A1 | 3/2014 | Narayanan |
| 2014/0096036 | A1 | 4/2014 | Mohler |
| 2014/0132595 | A1 | 5/2014 | Boulanger et al. |
| 2015/0215581 | A1 | 7/2015 | Barzuza et al. |
| 2015/0271220 | A1 | 9/2015 | Kleiner et al. |
| 2015/0279044 | A1 | 10/2015 | Kim et al. |
| 2016/0050394 | A1 | 2/2016 | Segal |
| 2016/0093108 | A1 | 3/2016 | Mao et al. |
| 2016/0132221 | A1 | 5/2016 | Lasser et al. |
| 2016/0155187 | A1 | 6/2016 | Paulrajan et al. |
| 2016/0156584 | A1 | 6/2016 | Hum et al. |
| 2016/0163070 | A1 | 6/2016 | Leacock et al. |
| 2016/0275952 | A1* | 9/2016 | Kashtan .............. G10L 17/00 |
| 2016/0353062 | A1 | 12/2016 | Ono et al. |
| 2017/0257405 | A1 | 9/2017 | Lo et al. |
| 2017/0357917 | A1 | 12/2017 | Holmes et al. |
| 2018/0005429 | A1 | 1/2018 | Osman et al. |
| 2018/0063480 | A1 | 3/2018 | Luks et al. |
| 2018/0095635 | A1 | 4/2018 | Valdivia et al. |
| 2018/0098059 | A1 | 4/2018 | Valdivia et al. |
| 2018/0101989 | A1 | 4/2018 | Frueh et al. |
| 2018/0139246 | A1 | 5/2018 | Rosenberg |
| 2018/0144212 | A1 | 5/2018 | Burgos et al. |
| 2018/0158246 | A1 | 6/2018 | Grau et al. |
| 2018/0227138 | A1 | 8/2018 | Faulkner et al. |
| 2018/0234671 | A1 | 8/2018 | Yang et al. |
| 2018/0356885 | A1 | 12/2018 | Ross et al. |
| 2018/0374268 | A1 | 12/2018 | Niles |
| 2019/0018479 | A1 | 1/2019 | Minami |
| 2019/0042640 | A1 | 2/2019 | Valeski |
| 2019/0045157 | A1 | 2/2019 | Venshtain et al. |
| 2019/0058870 | A1 | 2/2019 | Rowell et al. |
| 2019/0130629 | A1 | 5/2019 | Chand et al. |
| 2019/0171354 | A1 | 6/2019 | Dascola et al. |
| 2019/0253667 | A1 | 8/2019 | Valli |
| 2019/0279424 | A1 | 9/2019 | Clausen et al. |
| 2019/0310757 | A1 | 10/2019 | Lee et al. |
| 2019/0325658 | A1 | 10/2019 | Park et al. |
| 2019/0327392 | A1 | 10/2019 | Sarkar |
| 2019/0340828 | A1 | 11/2019 | Harvey |
| 2019/0346522 | A1 | 11/2019 | Botnar et al. |
| 2019/0371060 | A1 | 12/2019 | Energin et al. |
| 2019/0379750 | A1 | 12/2019 | Zamora Duran et al. |
| 2020/0020001 | A1 | 1/2020 | Singh et al. |
| 2020/0090350 | A1 | 3/2020 | Cho et al. |
| 2020/0097564 | A1 | 3/2020 | Zhou |
| 2020/0099891 | A1 | 3/2020 | Valli et al. |
| 2020/0118342 | A1 | 4/2020 | Varshney et al. |
| 2020/0126464 | A1 | 4/2020 | Onishi et al. |
| 2020/0128033 | A1 | 4/2020 | Kawakita |
| 2020/0128178 | A1* | 4/2020 | Shi .................... H04N 23/698 |
| 2020/0142475 | A1 | 5/2020 | Paez et al. |
| 2020/0143603 | A1 | 5/2020 | Kotake et al. |
| 2020/0154166 | A1 | 5/2020 | Rakshit et al. |
| 2020/0279411 | A1 | 9/2020 | Atria et al. |
| 2020/0286205 | A1 | 9/2020 | Doh et al. |
| 2020/0294000 | A1 | 9/2020 | Sexauer et al. |
| 2020/0296327 | A1 | 9/2020 | Karafin et al. |
| 2020/0302510 | A1 | 9/2020 | Chachek et al. |
| 2020/0302571 | A1* | 9/2020 | Schwarz ................ G06T 7/70 |
| 2020/0314385 | A1 | 10/2020 | Kang et al. |
| 2020/0322395 | A1* | 10/2020 | Copley ................. H04N 7/157 |
| 2020/0329214 | A1 | 10/2020 | Ahn et al. |
| 2020/0371665 | A1 | 11/2020 | Clausen et al. |
| 2020/0372140 | A1 | 11/2020 | Jaber et al. |
| 2020/0396266 | A1 | 12/2020 | Goel |
| 2021/0019541 | A1 | 1/2021 | Wang et al. |
| 2021/0029326 | A1 | 1/2021 | Oyman et al. |
| 2021/0099433 | A1 | 4/2021 | Soryal et al. |
| 2021/0120066 | A1 | 4/2021 | Oyman et al. |
| 2021/0149627 | A1 | 5/2021 | Jang et al. |
| 2021/0248727 | A1 | 8/2021 | Fisher et al. |
| 2021/0263593 | A1 | 8/2021 | Lacey |
| 2021/0281802 | A1 | 9/2021 | Kirisken |
| 2021/0336784 | A1 | 10/2021 | Athlur et al. |
| 2021/0385412 | A1 | 12/2021 | Matula et al. |
| 2021/0390767 | A1 | 12/2021 | Johnson et al. |
| 2021/0392175 | A1 | 12/2021 | Gronau et al. |
| 2021/0392296 | A1 | 12/2021 | Rabinovich et al. |
| 2021/0407520 | A1 | 12/2021 | Neckermann et al. |
| 2022/0084288 | A1 | 3/2022 | LeBeau et al. |
| 2022/0086167 | A1 | 3/2022 | LeBeau et al. |
| 2022/0086203 | A1 | 3/2022 | Morris et al. |
| 2022/0086205 | A1 | 3/2022 | LeBeau et al. |
| 2022/0103386 | A1 | 3/2022 | Jensen |
| 2022/0109810 | A1 | 4/2022 | Kancharlawar et al. |
| 2022/0116431 | A1 | 4/2022 | Mayfield et al. |
| 2022/0150083 | A1 | 5/2022 | Faulkner |
| 2022/0157342 | A1 | 5/2022 | Kliushkin et al. |
| 2022/0172444 | A1 | 6/2022 | LeBeau et al. |
| 2022/0174108 | A1 | 6/2022 | Oyman |
| 2022/0200979 | A1 | 6/2022 | Wenzel |
| 2022/0215342 | A1 | 7/2022 | Green |
| 2022/0222900 | A1 | 7/2022 | Tomizuka et al. |
| 2022/0229535 | A1 | 7/2022 | Evangelista et al. |
| 2022/0239887 | A1 | 7/2022 | Estee et al. |
| 2022/0252882 | A1 | 8/2022 | Berliner et al. |
| 2022/0385490 | A1 | 12/2022 | Lin et al. |
| 2022/0417308 | A1 | 12/2022 | Oyman |
| 2023/0082461 | A1 | 3/2023 | Gal et al. |
| 2023/0198745 | A1 | 6/2023 | Vansteenkiste et al. |
| 2024/0061636 | A1 | 2/2024 | Yu |
| 2024/0070957 | A1 | 2/2024 | Cross et al. |
| 2025/0023876 | A1 | 1/2025 | Shalowitz et al. |
| 2025/0104371 | A1 | 3/2025 | Tan et al. |

FOREIGN PATENT DOCUMENTS

| | | |
|---|---|---|
| EP | 3223116 A1 | 9/2017 |
| WO | 2008125593 A2 | 10/2008 |
| WO | 2011109126 A1 | 9/2011 |

(56) References Cited

FOREIGN PATENT DOCUMENTS

| | | |
|---|---|---|
| WO | 2020117657 A1 | 6/2020 |
| WO | 2021026078 A1 | 2/2021 |
| WO | 2022066438 A1 | 3/2022 |

OTHER PUBLICATIONS

ReelnReel., "Virtual Reality Video Conferencing: VR Video Conferencing Best Practices," Nov. 13, 2021, 14 pages, Retrieved from the Internet: URL: https://www.reelnreel.com/virtual-reality-video-conferencing/.

Baxter D.B., "Creating Treemap Chart Using JavaScript," AnyChart News, Aug. 1, 2019, 12 Pages.

EBook Reader, "Viewing Popular Highlights on Kindles," [Online], Feb. 15, 2018 [Retrieved on Aug. 5, 2020], 11 Pages, Retrieved from Internet: URL: https://blog.the-ebook-reader.com/2018/02/15/viewing-popular-highlights-on-kindles/.

European Search Report for European Patent Application No. 23189060.9, dated Nov. 15, 2023, 11 pages.

Garofalakis J., et al., "Personalized Web Search by Constructing Semantic Clusters of User Profiles," Springer Link [Online], 2008 [Retrieved on Aug. 5, 2020], 6 Pages, Retrieved on Internet: URL: https://link.springer.com/chapter/10.1007/978-3-540-85565-1_30.

Gauch S., et al., "Ontology-Based User Profiles for Search and Browsing," [Online], 2002 [Retrieved on Aug. 5, 2020], 6 Pages, Retrieved from Internet: URL: https://www.semanticscholar.org/paper/Ontology-Based-User-Profiles-for-Search-and-Gauch-Chaffee/93af7304757a9beabb10bfbca55b04045bf2ef90.

Gunkel S.N.B., et al., "360-Degree Photo-realistic VR Conferencing," 2019 IEEE Conference on Virtual Reality and 3D User Interfaces (VR), 2019, 2 pages.

Gupta K., et al., "Do You See What I See? The Effect ofGaze Tracking on Task Space Remote Collaboration," IEEE Transactions onVisualization and Computer Graphics, Nov. 2016, vol. 22, No. 11, pp. 2413-2422, DOI: 10.1109/TVCG.2016.2593778.

International Preliminary Report on Patentability for International Application No. PCT/US2022/042452, mailed Mar. 14, 2024, 6 pages.

International Preliminary Report on Patentability for International Application No. PCT/US2022/043375, mailed Mar. 28, 2024, 10 pages.

International Preliminary Report on Patentability for International Application No. PCT/US2023/012192, mailed Aug. 15, 2024, 6 pages.

International Search Report and Written Opinion for International Application No. PCT/US2021/038992, mailed Oct. 29, 2021, 16 pages.

International Search report and Written Opinion for International Application No. PCT/US2022/043375, mailed Jan. 2, 2023, 12 pages.

International Search Report and Written Opinion for International Application No. PCT/US2023/012192, mailed May 4, 2023, 8 pages.

Jikadra R., et al., "Video Calling with Augmented Reality Using WebRTC API," 2019 6th International Conference on Computing for Sustainable Global Development (INDIACom), Mar. 13, 2019, 5 pages.

Montaya L., et al., "Remote Collaboration with Augmented and Virtual Reality Interfaces," International Conference on Computer Graphics & Virtual Reality, Jan. 1, 2007, pp. 81-86.

"Pinterest Communities What are they and How can you Join?," Ivory Mix, Aug. 5, 2020, 19 Pages, Retrieved from Internet: URL: https://ivorymix.com/pinterest-communities/.

Schmeiser L., "Microsoft Analytics Aims to Analyze Worker Habits, Point to More Productivity," [Online], Jul. 5, 2017 [Retrieved on Aug. 5, 2020], 3 Pages, Retrieved from Internet: URL: https://www.itprotoday.com/office-365/microsoft-analytics-aims-analyze-worker-habits-point-more-productivity.

Semantic Arts, "White Paper: Semantic Profiling," [Online], Jan. 21, 2015 [Retrieved on Aug. 5, 2020], 11 Pages, Retrieved from Internet: https://www.semanticarts.com/white-paper-semantic-profiling/.

Shanmugam M., et al., "Research Opportunities on Virtual Reality and Augmented Reality: A Survey," 2019 IEEE International Conference on System, Computation, Automation and Networking (ICSCAN), Mar. 29, 2019, 6 pages.

Song X., et al., "A Scalable and Statistically Robust Beam Alignment Technique for mm-Wave Systems," May 8, 2018, 13 pages.

Tarpani G., "What is Google Wave?," Macworld [Online], Feb. 22, 2010 [Retrieved on Aug. 5, 2020], 7 Pages, Retrieved from Internet: URL: https://www.macworld.com/article/1146555/whatisgooglewave.html.

Unknown., "A Better Way to Meet Online," Gather, https://www.gather.town/ , Last Accessed Oct. 11, 2021.

Wanders I., "Build your Own Knowledge Graph: From Unstructured Dark Data to Valuable Business Insights," Vector Consulting [Online], Oct. 18, 2018 [Retrieved on 2020-80-05], 8 Pages, Retrieved from Internet: https:// medium.com/vectrconsulting/build-your-own-knowledge-graph-975cf6dde67f.

Welsford-Ackroyd F., et al., "Spectator View: Enabling Asymmetric Interaction between HMD Wearers and Spectators with a Large Display," Proceedings of the ACM on Human-Computer Interaction, Nov. 5, 2021, vol. 5, pp. 1-17.

Wikipedia, The Free Encyclopedia, "Google Wave," [Online], Aug. 5, 2020, 1 Page, Retrieved from Internet: URL: https://simple.wikipedia.org/wiki/Google_Wave.

Wikipedia, The Free Encyclopedia, "Treemapping," Aug. 5, 2020, 13 Pages, Retrieved from Internet: URL: https:// en.wikipedia.org/wiki/Treemapping.

Wikipedia, The Free Encyclopedia, "Unconference," Aug. 5, 2020, 3 Pages, Retrieved from Internet: URL: https://en.wikipedia.org/wiki/Unconference.

\* cited by examiner

SYSTEMS AND METHODS FOR STREAMING ARTIFICIAL REALITY DATA

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

Many users who play games, work, or create content in artificial reality (AR) environments enjoy sharing this content with colleagues, friends, family, or fans. It is currently possible to conveniently cast from the viewport of an AR headset to a nearby physical device in order to share AR content with users in the same physical location. However, no such convenient solution exists for sharing with users in a remote location. The present disclosure is generally directed to systems and methods for casting content from the viewport of an AR headset to conferencing software or similar apps by representing the visual and/or audio data being displayed in the headset viewport as a virtual webcam. In one embodiment, a process and/or daemon running on the receiving device may broadcast an endpoint for receiving the cast from the headset and then represent that headset to other applications on the device as a virtual webcam. Representing the AR video stream as a virtual webcam may enable any software that takes a webcam as an input to select the AR stream as an input, enabling users to share their headset view via various types of videoconferencing software. Being able to share their headset view with remote users may enable users to share AR experiences with friends, family, and co-workers around the world.

In some embodiments, the systems described herein may improve the functioning of a computing device by enabling the computing device to receive content from an AR device and represent that content as input from a webcam to applications on the computing device. Additionally, the systems described herein may improve the fields of AR conferencing and/or AR content creation by enabling users to conveniently share AR content with remote users.

Figure 1:
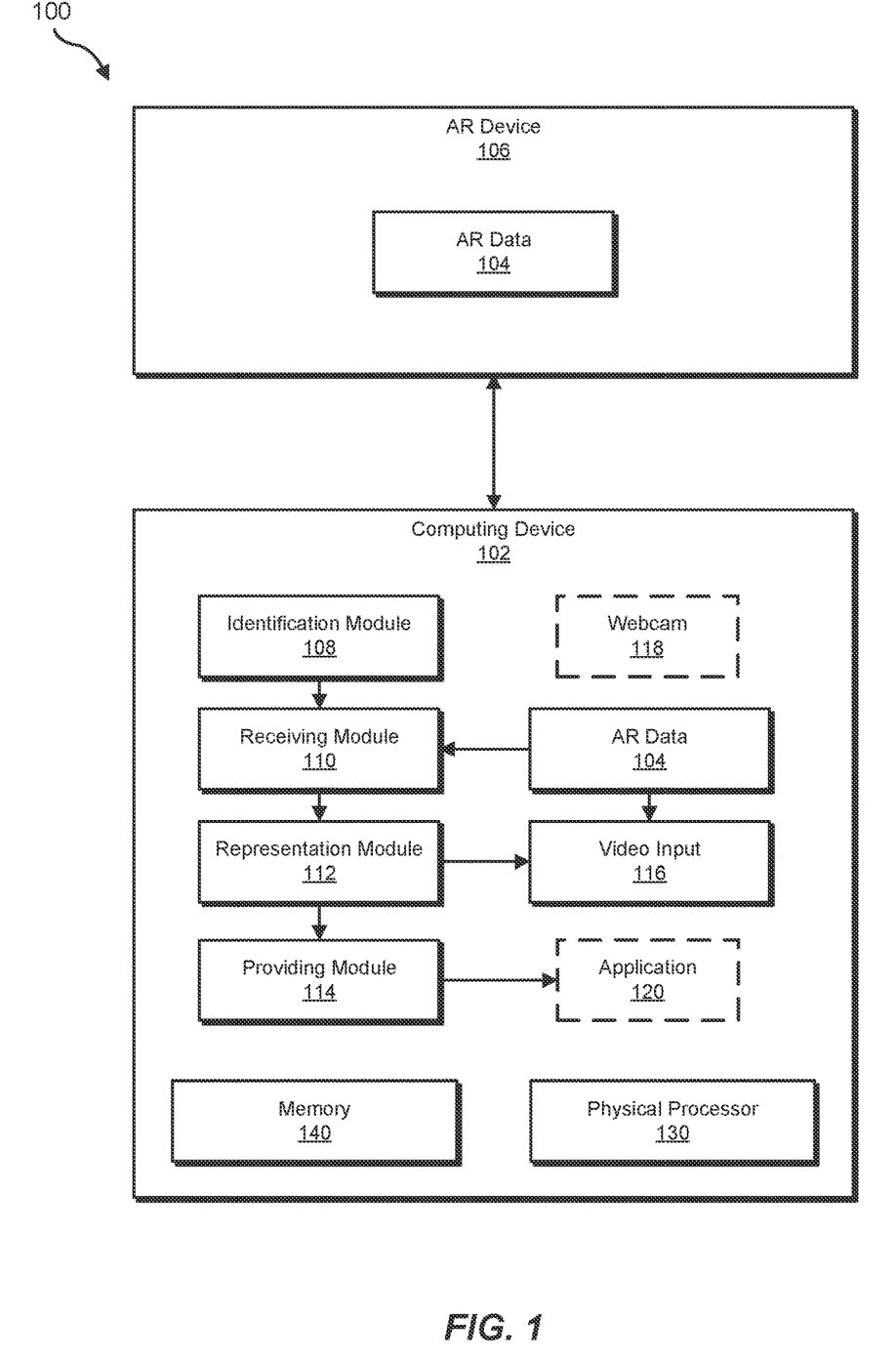
FIG. 1 is a block diagram of an exemplary system for streaming artificial reality data.

In some embodiments, the systems described herein may send data between local devices. FIG. 1 is a block diagram of an exemplary system 100 for streaming AR data. In one embodiment, and as will be described in greater detail below, a computing device 102 may be configured with an identification module 108 that may identify an AR device 106 that includes a physical display that displays a stream of AR data 104 to the user of AR device 106. Computing device 102 may also be configured with a receiving module 110 that may receive, by computing device 102 that is configured to receive video input 116 from a webcam 118, the AR data 104 from AR device 106. After receiving AR data 104, a representation module 112 may represent AR data 104 as video input 116 from webcam 118. Next, a providing module 114 may provide, to an application 120 on computing device 102 that is configured to receive webcam data as input, AR data 104 represented as video input 116.

AR device 106 generally represents any type or form of device for displaying an AR environment to a user. In some embodiments, an AR device may be a head-mounted display designed to be worn on a user's head with a display surface (e.g., a viewport) in front of the user's eyes. For example, an AR device may be a headset or glasses. Further descriptions of AR devices, AR environments, and related AR technology will be provided below in connection with FIGS. 7 and 8.

Computing device 102 generally represents any type or form of computing device capable of reading computer-executable instructions. For example, computing device 102 may represent a personal computing device such as a laptop. In some embodiments, computing device 102 may be a general-purpose computing device not specifically configured to display AR data. For example, a laptop may be capable of displaying AR data after processing and/or transforming the data but may not natively display AR data and/or may not be physically capable of displaying a fully three-dimensional AR environment. Additional examples of computing device 102 may include, without limitation, a desktop, a wearable device, a smart device, a personal digital assistant (PDA), etc.

Webcam 118 generally represents any type or form of physical camera connected to a computing device. In some embodiments, a webcam may be built into a computing device, such as a laptop or phone's built-in camera. In other embodiments, a webcam may be a separate device connected to a computing device via a wired or wireless connection. In some embodiments, computing device 102 may be configured with webcam 118. In other embodiments, computing device 102 may not be configured with webcam 118 but may be configured to receive video input from a webcam if one is connected at some later point in time.

Application 120 generally represents any computing software, website, process, and/or app that is configured to receive video input from a webcam. In some embodiments, application 120 may be a videoconferencing application that transmits audio and/or video data to remote participants. Additionally or alternatively, application 120 may be another type of application that transmits audio and/or video, such as a streaming application. In some embodiments, application 120 may be a third-party application published by a third-party to a vendor of the AR device that is not configured to receive AR data. For example, application 120 may be a videoconferencing application that is configured to receive video input from a webcam and/or from a shared screen of the computing device but not from any other source and that is published by a vendor that is not the creator and/or vendor of the AR device. In this example, it may not be possible for the vendor of the AR device or the user of application 120 to configure application 120 to receive AR data directly from an AR device.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
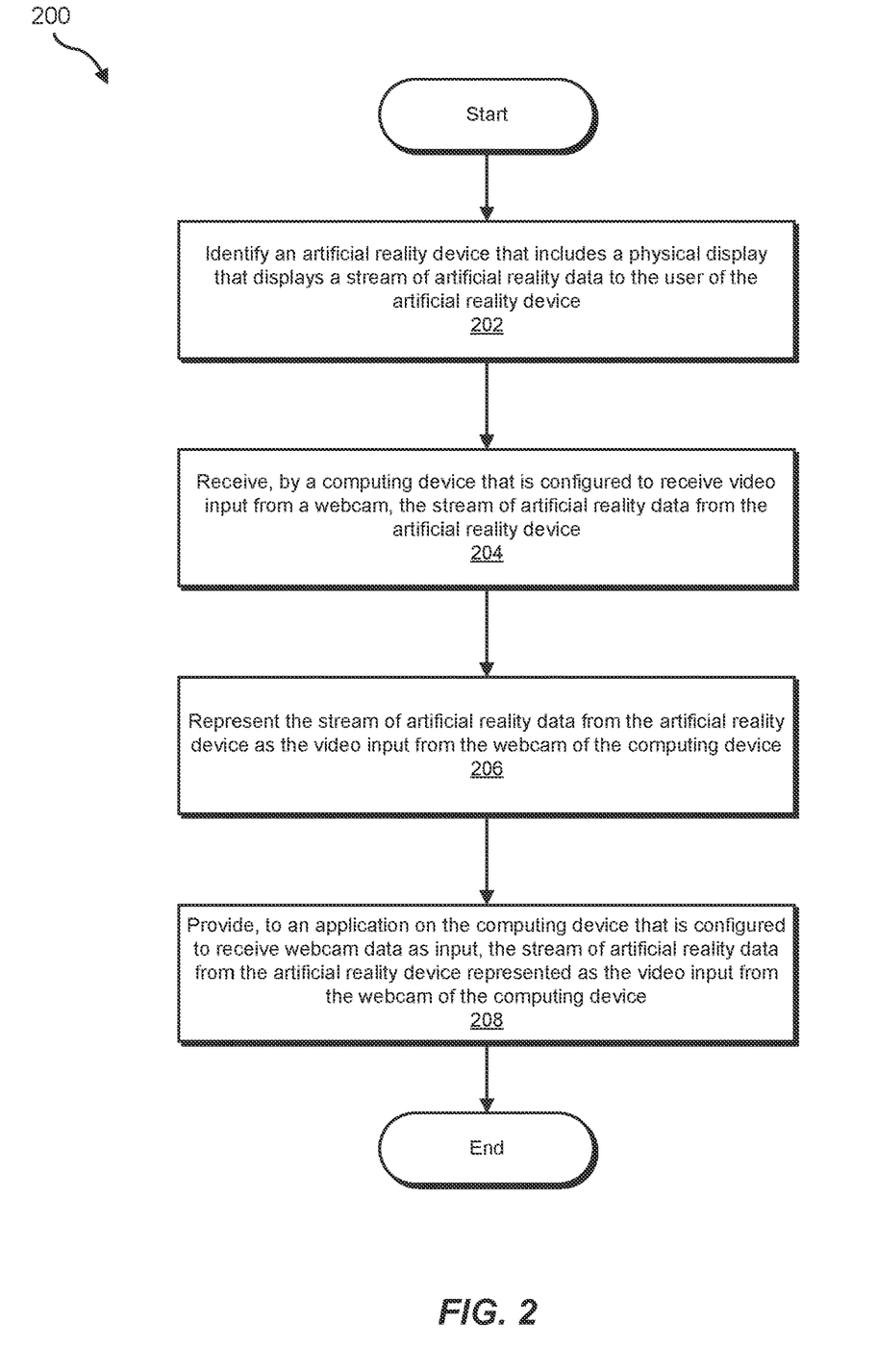
FIG. 2 is a flow diagram of an exemplary method for streaming artificial reality data.

FIG. 2 is a flow diagram of an exemplary method 200 for streaming AR data. In some examples, at step 202, the systems described herein may identify an AR device that includes a physical display that displays a stream of AR data to the user of the AR device.

The term physical display may generally refer to any hardware component or collection of hardware components working in conjunction that display visual data to a user of a device. In some embodiments, a physical display of an AR device may include one or more lenses configured to be positioned in front of a user's eyes and display three-dimensional views of an AR environment. In some embodiments, an AR device may also include one or more speakers that play audio of the AR environment for the user.

The term stream of AR data, or AR data, as used herein, may generally refer to any video and/or audio data of an AR environment. In some embodiments, the stream of AR data may be an unprocessed stream of AR data from the AR device that is configured to be displayed on a display surface of the AR device (e.g., lenses) for three-dimensional display and requires processing before being displayed on a two-dimensional rectilinear display surface. In other embodiments, the stream of AR data may be processed on the AR device to be displayed on a two-dimensional rectilinear display surface.

The systems described herein may identify the AR device in a variety of ways and/or contexts. In one example, the AR device may be connected to the same network as the computing device (e.g., a home wi-fi network). Additionally or alternatively, the AR device may be paired with the computing device (e.g., via a near-field communication technology). In some examples, the AR device may be registered to a user account that is also associated with the computing device (e.g., an account on a social media platform).

At step 204, the systems described herein may receive, by a computing device that is configured to receive video input from a webcam, the stream of AR data from the AR device. The systems described herein may receive the stream of AR data in a variety of ways. For example, the systems described herein may receive the data wirelessly (e.g., via a wi-fi network, near-field communication, etc.).

Figure 3:
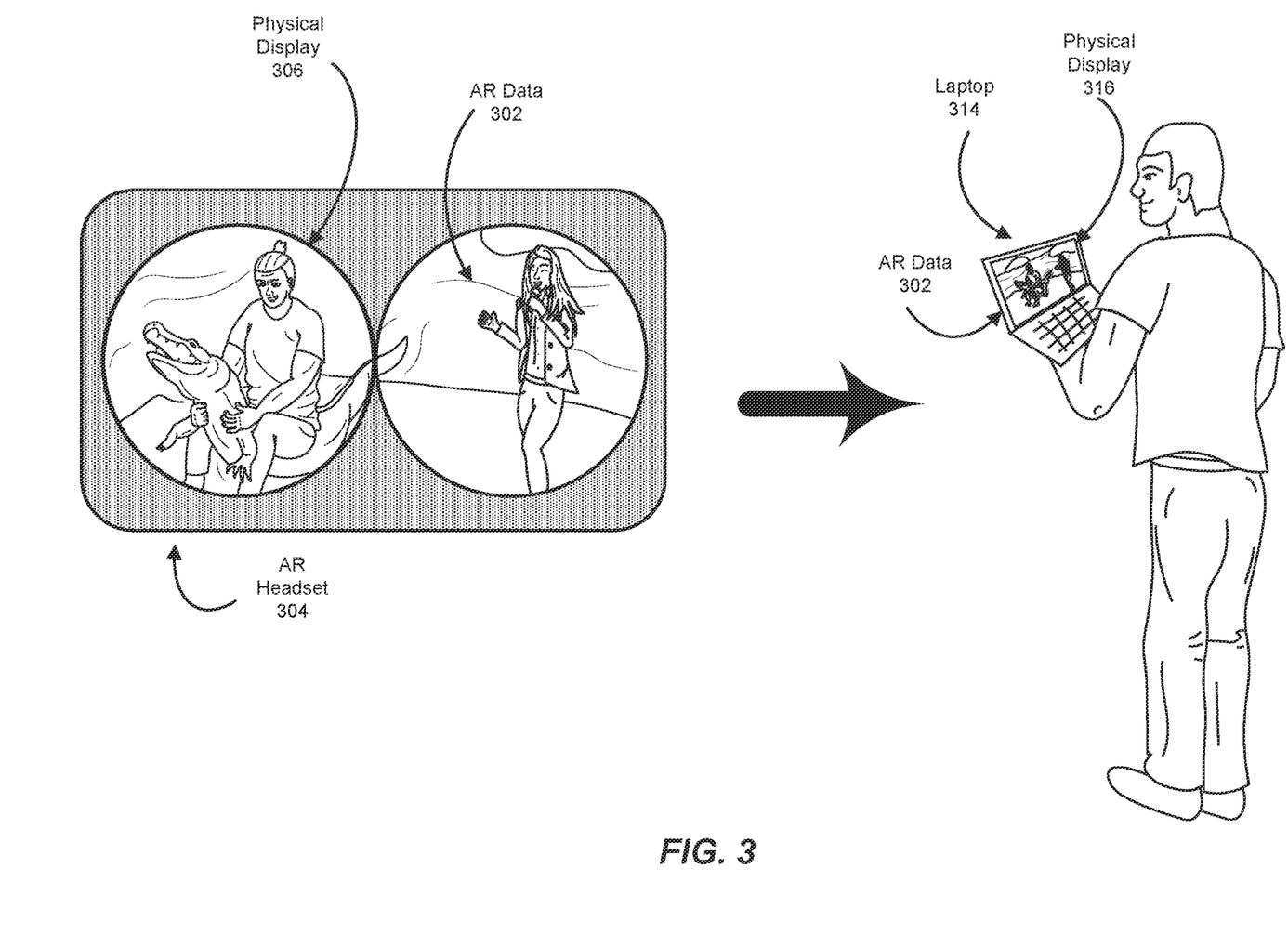
FIG. 3 is an illustration of an exemplary artificial reality device and non-artificial-reality computing device.

In some embodiments, the systems described herein may receive data that has been processed by the AR device for display on a non-AR computing device (e.g., with a rectilinear screen that displays two-dimensional data) while in other embodiments, the systems described herein may receive AR data that has not been processed. For example, as illustrated in FIG. 3, an AR headset 304 may have a physical display 306 that displays AR data 302 to a user wearing headset 304 to view a virtual alligator wrestling tournament in three dimensions. In one example, AR headset 304 may send AR data 302 to a laptop 314. The systems described herein may process AR data 302 (e.g., by representing AR data 302 as a virtual webcam, as discussed below) for display on display surface 316 of laptop 314 so that additional users can view the alligator wrestling tournament in two dimensions via laptop 314.

In some embodiments, the systems described herein may broadcast, by the computing device, an endpoint for receiving AR data streams and receive, to the endpoint, the stream of AR data. For example, a daemon, process, and/or application on the computing device may use a custom protocol to broadcast an endpoint for receiving AR data and the AR device may be configured to identify endpoints using the custom protocol. Additionally or alternatively, the systems described herein may broadcast the endpoint via an existing protocol, such as a simple service discovery protocol.

Returning to FIG. 2, at step 206, the systems described herein may represent the stream of AR data from the AR device as the video input from the webcam of the computing device.

The systems described herein may process the stream of AR data in order to present the AR data as video input from a webcam in a variety of ways. In one embodiment, the systems described herein may represent the stream of AR data from the AR device as the video input from the webcam of the computing device by processing the stream of AR content via a virtual webcam driver.

The systems described herein may process the stream of AR content in a variety of ways, both before feeding the stream to the virtual webcam driver and via the virtual webcam driver. In some embodiments, the systems described herein may process the stream of AR content to remove the warping of the headset view (e.g., by sending the stream before the warping is added or reversing the warping process afterwards). In one embodiment, the systems described herein may conform the frame rate of the stream of AR data to the frame rate of a physical webcam being mimicked by the virtual webcam. In some examples, the webcam frame rate may be lower than the frame rate of the headset. For example, the systems described herein may process the stream of AR data by dropping frames until the framerate is 30 frames per second or lower. In some examples, the systems described herein may change the color space and/or video format of the stream of AR data.

In some embodiments, the systems described herein may alter the audio component of the stream of AR data, such as by converting the audio from directional or surround audio to mono or stereo audio. In one example, the systems described herein may remove audio channels from the stream of AR data, such as music or ambient environmental sound effects.

In one embodiment, the systems described herein may insert a static image or an animation into gaps in the stream (e.g., when the AR device is not currently on or not currently streaming data) so that a user can select the feed from the AR device as a webcam even if the AR device is not currently sending data.

At step 208, the systems described herein may provide, to an application on the computing device that is configured to receive webcam data as input, the stream of AR data from the AR device represented as the video input from the webcam of the computing device.

Figure 4:
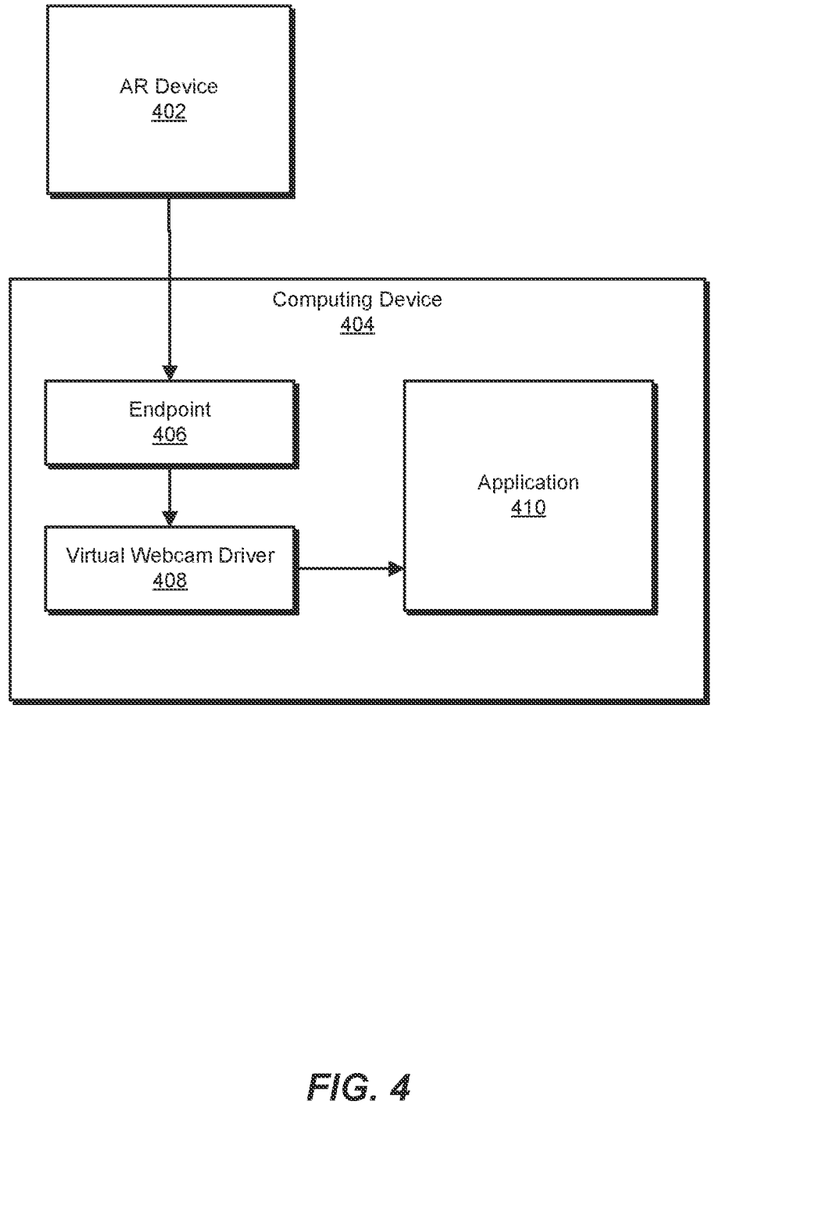
FIG. 4 is block diagram of an exemplary system for streaming artificial reality data via an endpoint and a virtual webcam driver.

The systems described herein may provide the stream of AR data in a variety of ways to a variety of types of applications. In one embodiment, the systems described herein may broadcast the availability of a specific endpoint, receive the AR data at the endpoint, process the data to prepare the data for being a video feed from a virtual webcam driver, and present the processed data as a webcam video feed to an application. For example, as illustrated in FIG. 4, a computing device 404 may broadcast an endpoint 406 that may be detected by an AR device 402. In one example, AR device 402 may send a stream of AR data to endpoint 406. A daemon, process, and/or other software on computing device 404 may receive the AR data at endpoint 406 and process the AR data via a virtual webcam driver 408 to present to an application 410 as a video stream from a webcam.

Figure 5:
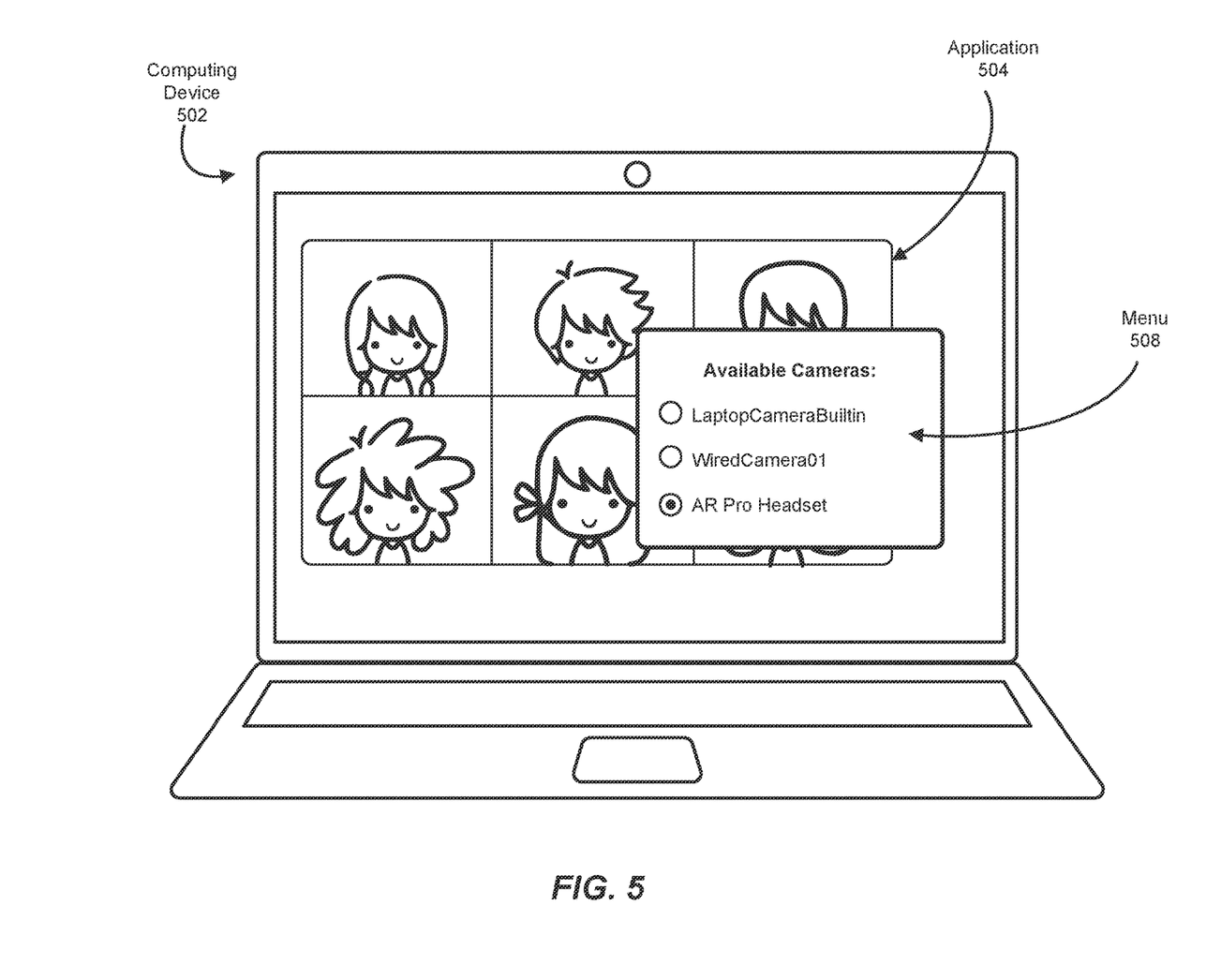
FIG. 5 is an illustration of an exemplary application receiving streaming artificial reality data.

In one embodiment, the systems described herein may provide, to the application on the computing device that is configured to receive webcam data as input, the stream of AR data by displaying an identifier of the stream of AR data in a user interface (e.g., a graphical user interface) that lists camera feeds (i.e., output captured by physical or virtual cameras) available for display within the application. For example, as illustrated in FIG. 5, a computing device 502 may receive a stream of AR data and present that data to an application 504 as a webcam. In this example, application 504 may be a videoconferencing application. When the user of computing device 502 opens camera selection menu 508 within application 504, the AR device may be listed as an available camera. If the user selects the AR device as the active camera for application 504, the systems described herein may stream the AR data to application 504 as if the AR data were coming from a webcam. This may enable the user to share data from the AR headset with other users via application 504. In some embodiments, the systems described herein may also transmit data from application 504 to the AR headset. For example, if a user is streaming AR data from a headset to a videoconference, the systems described herein may transmit audio data from the videoconference to be played by a speaker in the headset.

Figure 6:
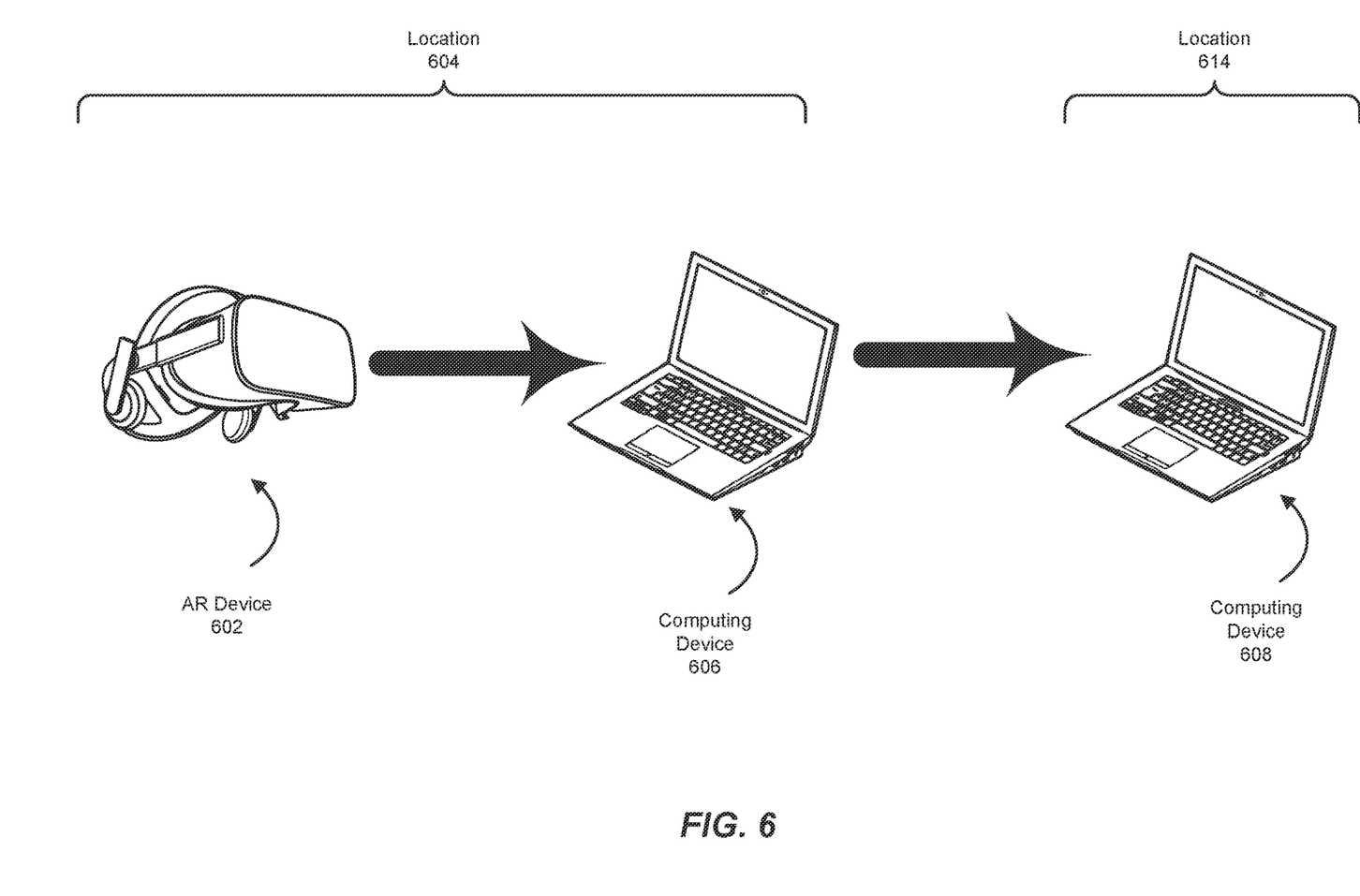
FIG. 6 is an illustration of an exemplary set of devices streaming artificial reality data to a remote device.

In some embodiments, the systems described herein may transmit, via the computing device, the stream of AR data from the AR device represented as the video input from the webcam of the computing device to an additional computing device that is remote from the computing device. For example, as illustrated in FIG. 6, a computing device 606 in a location 604 may receive a stream of AR data from an AR device 602 that is also in location 604 (e.g., a house, an office, a virtual reality café, etc.). The systems described herein may present the stream of AR data as a stream of webcam data to an application on computing device 606 that may transmit that data to a computing device 608 in a location 614 that is remote from location 604 (e.g., another house, office, etc.). In some embodiments, computing device 608 may be a general-purpose computing device not specifically configured to receive and/or display AR data, such as a laptop, desktop, tablet, smart phone, digital projector, etc. In one example, the systems described herein may provide the AR data to a videoconferencing application that may transmit the data to users in multiple remote locations as part of the videoconference, enabling the users in the remote locations to view the AR data on laptops and other non-AR personal computing devices. In some examples, the systems described herein may transmit audio and video received from the AR device to one or more non-AR devices in one or more remote locations.

In some embodiments, the systems described herein may provide additional types of video data to an application as webcam data. In one example, the systems described herein may receive a stream of video data, represent the stream of video data as additional video input from the webcam of the computing device, and provide, to the application on the computing device that is configured to receive the webcam data as input, the stream of video data represented as the additional video input from the webcam of the computing device. For example, the systems described herein may present video data from a game, web browser, or other application on the computing device as video data from a webcam to an application. This may be beneficial if the application is not capable of streaming data from a shared screen and/or processes video data in higher quality when that data is received from a webcam rather than a shared screen.

As described above, the systems and methods described herein may enable users to share AR experiences with other users in both local and remote locations by presenting streaming AR data as webcam data to applications that are configured to receive data from webcams but not from AR devices. By presenting AR data as webcam data, the systems described herein may enable users to use videoconference applications and other applications to share AR experiences without requiring users to install, configure, and/or use bespoke AR-video-sharing applications or cumbersome workarounds or plug-ins.

Embodiments of the present disclosure may include or be implemented in conjunction with various types of artificial reality, virtual reality, and/or augmented reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
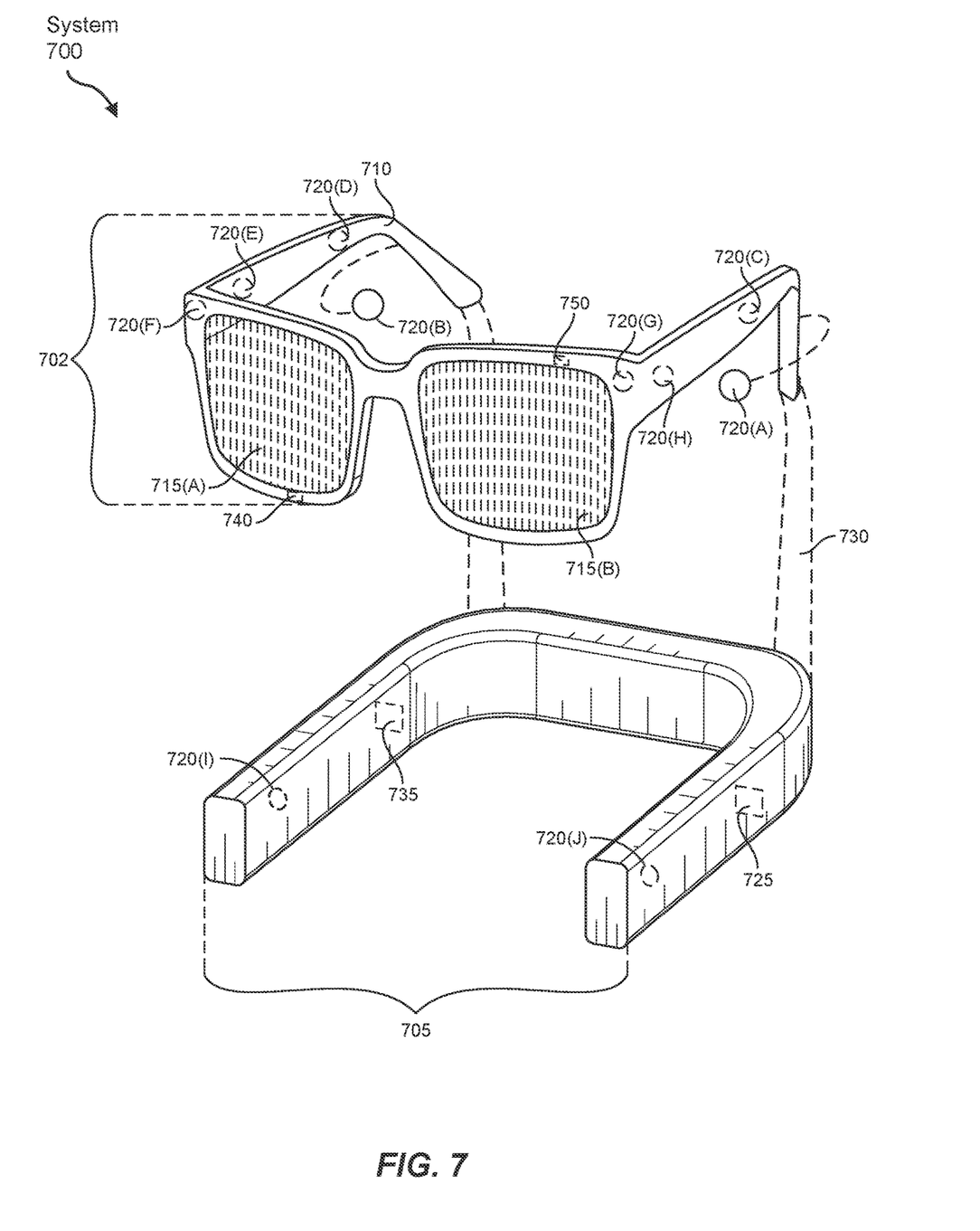
FIG. 7 is an illustration of exemplary augmented-reality glasses that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-120(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on frame 710, and/or acoustic transducers 720(I) and 720(J), which may be positioned on a corresponding neckband 705.

In some embodiments, one or more of acoustic transducers 720(A)-(J) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality system 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a BLUETOOTH connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720(D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium-ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial-reality experience.

Figure 8:
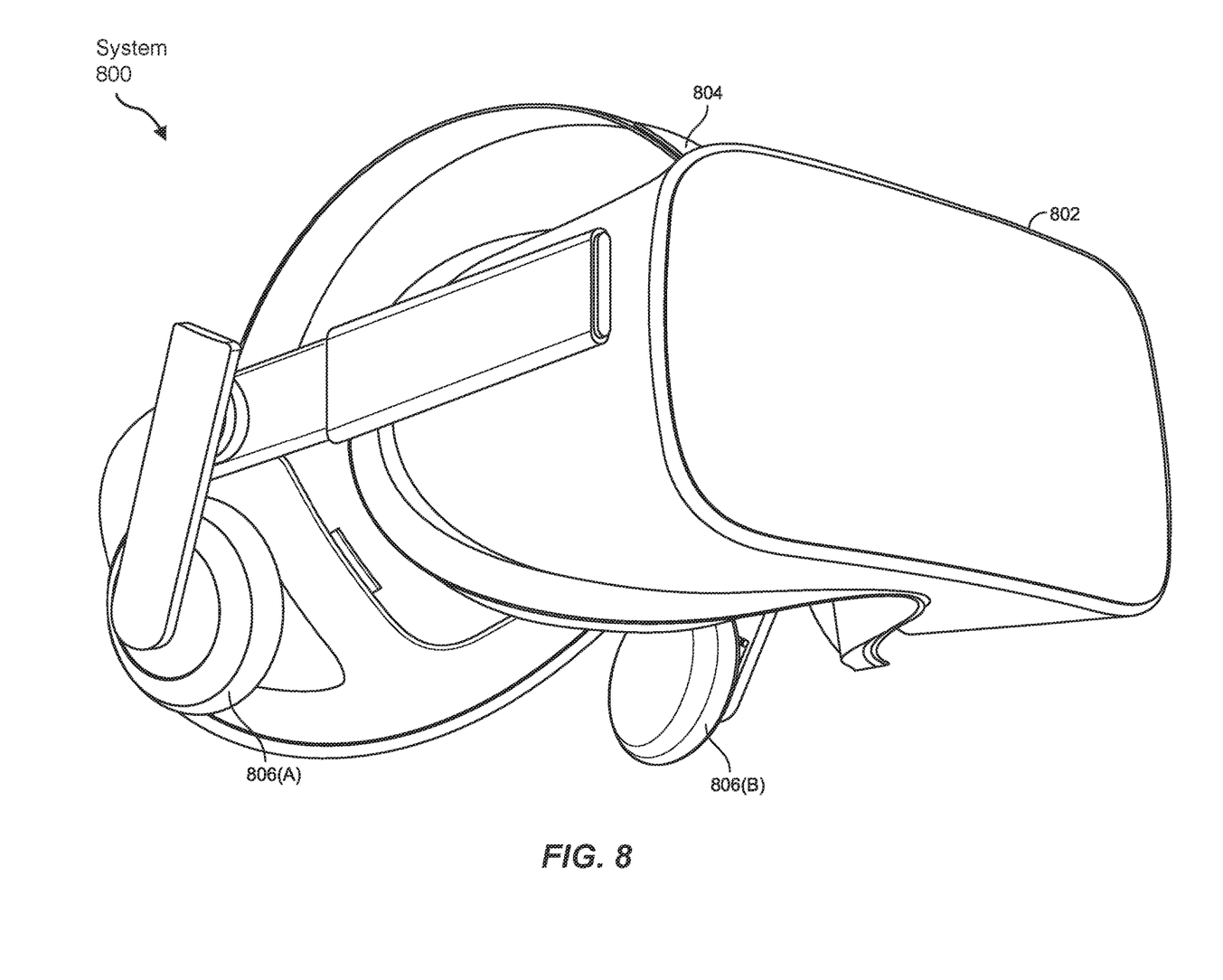
FIG. 8 is an illustration of an exemplary virtual-reality headset that may be used in connection with embodiments of this disclosure.

Artificial reality systems may include a variety of types of visual feedback mechanisms. For example, display devices in augmented-reality system 700 and/or virtual-reality system 800 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

Example Embodiments

Example 1: A method for streaming AR data may include (i) identifying an artificial reality device that includes a physical display that displays a stream of artificial reality data to the user of the artificial reality device, (ii) receiving, by a computing device that is configured to receive video input from a webcam, the stream of artificial reality data from the artificial reality device, (iii) representing the stream of artificial reality data from the artificial reality device as the video input from the webcam of the computing device, and (iv) providing, to an application on the computing device that is configured to receive webcam data as input, the stream of artificial reality data from the artificial reality device represented as the video input from the webcam of the computing device.

Example 2: The computer-implemented method of example 1, where the artificial reality device includes a head-mounted display.

Example 3: The computer-implemented method of examples 1-2, where the stream of artificial reality data includes video and audio data of an artificial reality environment.

Example 4: The computer-implemented method of examples 1-3, where the computing device includes a general-purpose computing device not specifically configured to display artificial reality data.

Example 5: The computer-implemented method of examples 1-4, where receiving, by the computing device, the stream of artificial reality data from the artificial reality device includes broadcasting, by the computing device, an endpoint for receiving artificial reality data streams and receiving, to the endpoint, the stream of artificial reality data.

Example 6: The computer-implemented method of examples 1-5, where providing, to the application on the computing device that is configured to receive webcam data as input, the stream of artificial reality data includes displaying an identifier of the stream of artificial reality data in a user interface that lists camera feeds available for display within the application.

Example 7: The computer-implemented method of examples 1-6 may further include transmitting, via the computing device, the stream of artificial reality data from the artificial reality device represented as the video input from the webcam of the computing device to an additional computing device that is remote from the computing device.

Example 8: The computer-implemented method of examples 1-7, where representing the stream of artificial reality data from the artificial reality device as the video input from the webcam of the computing device includes processing the stream of artificial reality content via a virtual webcam driver.

Example 9: The computer-implemented method of examples 1-8 may further include receiving, by the computing device, a stream of video data, representing the stream of video data as additional video input from the webcam of the computing device, and providing, to the application on the computing device that is configured to receive the webcam data as input, the stream of video data represented as the additional video input from the webcam of the computing device.

Example 10: The computer-implemented method of examples 1-9, where the application includes a third-party application published by a third-party to a vendor of the artificial reality device.

Example 11: A system for—may include at least one physical processor and physical memory including computer-executable instructions that, when executed by the physical processor, cause the physical processor to (i) identify an artificial reality device that includes a physical display that displays a stream of artificial reality data to the user of the artificial reality device, (ii) receive, by a computing device that is configured to receive video input from a webcam, the stream of artificial reality data from the artificial reality device, (iii) represent the stream of artificial reality data from the artificial reality device as the video input from the webcam of the computing device, and (iv) provide, to an application on the computing device that is configured to receive webcam data as input, the stream of artificial reality data from the artificial reality device represented as the video input from the webcam of the computing device.

Example 12: The system of example 14, where the artificial reality device includes a head-mounted display.

Example 13: The system of examples 12-13, where the stream of artificial reality data includes video and audio data of an artificial reality environment.

Example 14: The system of examples 12-13, where the computing device includes a general-purpose computing device not specifically configured to display artificial reality data.

Example 15: The system of examples 12-14, where receiving, by the computing device, the stream of artificial reality data from the artificial reality device includes broadcasting, by the computing device, an endpoint for receiving artificial reality data streams and receiving, to the endpoint, the stream of artificial reality data.

Example 16: The system of examples 12-15, where providing, to the application on the computing device that is configured to receive webcam data as input, the stream of artificial reality data includes displaying an identifier of the stream of artificial reality data in a user interface that lists camera feeds available for display within the application.

Example 17: The system of examples 12-16, where the computer-executable instructions cause the physical processor to transmit, via the computing device, the stream of artificial reality data from the artificial reality device represented as the video input from the webcam of the computing device to an additional computing device that is remote from the computing device.

Example 18: The system of examples 12-17, where representing the stream of artificial reality data from the artificial reality device as the video input from the webcam of the computing device includes processing the stream of artificial reality content via a virtual webcam driver.

Example 19: The system of examples 12-18, where the computer-executable instructions further cause the physical processor to receive, by the computing device, a stream of video data, represent the stream of video data as additional video input from the webcam of the computing device, and provide, to the application on the computing device that is configured to receive the webcam data as input, the stream of video data represented as the additional video input from the webcam of the computing device.

Example 20: A non-transitory computer-readable medium may include one or more computer-readable instructions that, when executed by at least one processor of a computing device, cause the computing device to (i) identify an artificial reality device that includes a physical display that displays a stream of artificial reality data to the user of the artificial reality device, (ii) receive, by a computing device that is configured to receive video input from a webcam, the stream of artificial reality data from the artificial reality device, (iii) represent the stream of artificial reality data from the artificial reality device as the video input from the webcam of the computing device, and (iv) provide, to an application on the computing device that is configured to receive webcam data as input, the stream of artificial reality data from the artificial reality device represented as the video input from the webcam of the computing device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive streaming AR data to be transformed, transform the streaming AR data by representing the data stream as webcam data, output a result of the transformation to provide the streaming AR data to an application that expects input from a webcam, use the result of the transformation to transmit the streaming AR data via the application, and store the result of the transformation to record the stream via the app. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying an artificial reality device that comprises a physical display that displays a stream of artificial reality data to a user of the artificial reality device, wherein the stream of artificial reality data displayed on the physical display of the artificial reality device includes three-dimensional data;
   receiving, by a computing device that is configured to receive video input from a webcam, the stream of artificial reality data from the artificial reality device, wherein the stream of artificial reality data is converted from the three-dimensional data to two-dimensional data displayable on the computing device;
   representing the stream of artificial reality data from the artificial reality device as the video input from the webcam of the computing device, wherein representing the stream of artificial reality data comprises processing the stream to make it compatible with webcam input; and
   providing, to an application on the computing device that is configured to receive webcam data as input, the stream of artificial reality data from the artificial reality device represented as the video input from the webcam of the computing device.

2. The computer-implemented method of claim 1, wherein the artificial reality device comprises a head-mounted display.

3. The computer-implemented method of claim 1, wherein the stream of artificial reality data comprises video and audio data of an artificial reality environment.

4. The computer-implemented method of claim 1, wherein the computing device comprises a general-purpose computing device not specifically configured to display artificial reality data.

5. The computer-implemented method of claim 1, wherein receiving, by the computing device, the stream of artificial reality data from the artificial reality device comprises:
   broadcasting, by the computing device, an endpoint for receiving artificial reality data streams; and
   receiving, to the endpoint, the stream of artificial reality data.

6. The computer-implemented method of claim 1, wherein providing, to the application on the computing device that is configured to receive webcam data as input, the stream of artificial reality data comprises displaying an identifier of the stream of artificial reality data in a user interface that lists camera feeds available for display within the application.

7. The computer-implemented method of claim 1, further comprising transmitting, via the computing device, the stream of artificial reality data from the artificial reality device represented as the video input from the webcam of the computing device to an additional computing device that is remote from the computing device.

8. The computer-implemented method of claim 1, wherein representing the stream of artificial reality data from the artificial reality device as the video input from the webcam of the computing device further comprises processing the stream of artificial reality content via a virtual webcam driver.

9. The computer-implemented method of claim 1, further comprising:
   receiving, by the computing device, a stream of video data;
   representing the stream of video data as additional video input from the webcam of the computing device; and
   providing, to the application on the computing device that is configured to receive the webcam data as input, the stream of video data represented as the additional video input from the webcam of the computing device.

10. The computer-implemented method of claim 1, wherein the application comprises a third-party application published by a third-party to a vendor of the artificial reality device.

11. A system comprising:
at least one physical processor; and
physical memory comprising computer-executable instructions that, when executed by the physical processor, cause the physical processor to:
identify an artificial reality device that comprises a physical display that displays a stream of artificial reality data to a user of the artificial reality device, wherein the stream of artificial reality data displayed on the physical display of the artificial reality device includes three-dimensional data;
receive, by a computing device that is configured to receive video input from a webcam, the stream of artificial reality data from the artificial reality device, wherein the stream of artificial reality data is converted from the three-dimensional data to two-dimensional data displayable on the computing device;
represent the stream of artificial reality data from the artificial reality device as the video input from the webcam of the computing device by processing the stream to make it compatible with webcam input; and
provide, to an application on the computing device that is configured to receive webcam data as input, the stream of artificial reality data from the artificial reality device represented as the video input from the webcam of the computing device.

12. The system of claim 11, wherein the artificial reality device comprises a head-mounted display.

13. The system of claim 11, wherein the stream of artificial reality data comprises video and audio data of an artificial reality environment.

14. The system of claim 11, wherein the computing device comprises a general-purpose computing device not specifically configured to display artificial reality data.

15. The system of claim 11, wherein receiving, by the computing device, the stream of artificial reality data from the artificial reality device comprises:
broadcasting, by the computing device, an endpoint for receiving artificial reality data streams; and
receiving, to the endpoint, the stream of artificial reality data.

16. The system of claim 11, wherein providing, to the application on the computing device that is configured to receive webcam data as input, the stream of artificial reality data comprises displaying an identifier of the stream of artificial reality data in a user interface that lists camera feeds available for display within the application.

17. The system of claim 11, wherein the computer-executable instructions further cause the physical processor to transmit, via the computing device, the stream of artificial reality data from the artificial reality device represented as the video input from the webcam of the computing device to an additional computing device that is remote from the computing device.

18. The system of claim 11, wherein representing the stream of artificial reality data from the artificial reality device as the video input from the webcam of the computing device comprises processing the stream of artificial reality content via a virtual webcam driver.

19. The system of claim 11, wherein the computer-executable instructions further cause the physical processor to:
receive, by the computing device, a stream of video data;
represent the stream of video data as additional video input from the webcam of the computing device; and
provide, to the application on the computing device that is configured to receive the webcam data as input, the stream of video data represented as the additional video input from the webcam of the computing device.

20. A non-transitory computer-readable medium comprising one or more computer-readable instructions that, when executed by at least one processor of a computing device, cause the computing device to:
identify an artificial reality device that comprises a physical display that displays a stream of artificial reality data to a user of the artificial reality device, wherein the stream of artificial reality data displayed on the physical display of the artificial reality device includes three-dimensional data;
receive, by a computing device that is configured to receive video input from a webcam, the stream of artificial reality data from the artificial reality device, wherein the stream of artificial reality data is converted from the three-dimensional data to two-dimensional data displayable on the computing device;
represent the stream of artificial reality data from the artificial reality device as the video input from the webcam of the computing device by processing the stream to make it compatible with webcam input; and
provide, to an application on the computing device that is configured to receive webcam data as input, the stream of artificial reality data from the artificial reality device represented as the video input from the webcam of the computing device.

* * * * *